(12) United States Patent
Boland (10) Patent No.: US 7,027,593 B2
(45) Date of Patent: Apr. 11, 2006

(54) APPARATUS AND METHOD FOR ECHO CONTROL

(75) Inventor: Simon Daniel Boland, Pennant Hills (AU)

(73) Assignee: Avaya Technology Corp., Basking Ridge, NJ (US)

(*) Notice: Subject to any disclaimer, the term of this patent is extended or adjusted under 35 U.S.C. 154(b) by 324 days.

(21) Appl. No.: 10/153,106

(22) Filed: May 22, 2002

(65) Prior Publication Data

US 2003/0219112 A1 Nov. 27, 2003

(51) Int. Cl.
*H04M 1/00* (2006.01)
(52) U.S. Cl. .............................. 379/406.1; 379/406.03; 379/406.01
(58) Field of Classification Search ............ 379/406.01, 379/406.02, 406.06, 406.08, 406.03, 406.1
See application file for complete search history.

(56) References Cited

U.S. PATENT DOCUMENTS

| | | | |
|---|---|---|---|
| 3,784,747 A * | 1/1974 | Berkley et al. ........ | 379/406.14 |
| 5,737,410 A * | 4/1998 | Vahatalo et al. ....... | 379/406.08 |
| 5,909,384 A | 6/1999 | Tal et al. | |
| 5,999,901 A | 12/1999 | Knittle et al. | |
| 6,256,384 B1 | 7/2001 | Trump | |
| 6,654,463 B1 * | 11/2003 | Leonidov et al. ...... | 379/406.08 |

OTHER PUBLICATIONS

Draft New Recommendation P.862: Perceptual Evaluation of Speech Quality (PESQ), An Objective Method For End-To-End Speech Quality Assessment of Narrow-Band Telephone Networks and Speech CODECS, COM 12-5-E, ITU Telecommunication Standard Sector, Nov. 2000.
PESQ—the new ITU standard for end-to-end speech quality assessment, A.W. Rix, et al. , AES 109th Convention Los Angeles, Sep. 22-25, 200, pp. 1-18.
The Perceptual Analysis Measurement System For Robust End-To-End Speech Quality Assessment, A.W. Rix, et al., IEEE, 2000, pp. 1515-1518.

* cited by examiner

*Primary Examiner*—Jefferey F. Harold
(74) *Attorney, Agent, or Firm*—John C. Moran (57) ABSTRACT

Determining the time delay between a transmitted signal and an echo. Then, the echo canceller is adjusted by the delay amount so that the echo canceller tail length is relatively short.

16 Claims, 6 Drawing Sheets

APPARATUS AND METHOD FOR ECHO CONTROL

TECHNICAL FIELD

The present invention relates to telecommunications switching systems and, in particular, to providing echo control across local exchange carrier systems, interexchange carrier systems, telecommunication terminals and business communication switching systems.

BACKGROUND OF THE INVENTION

Figure 1:
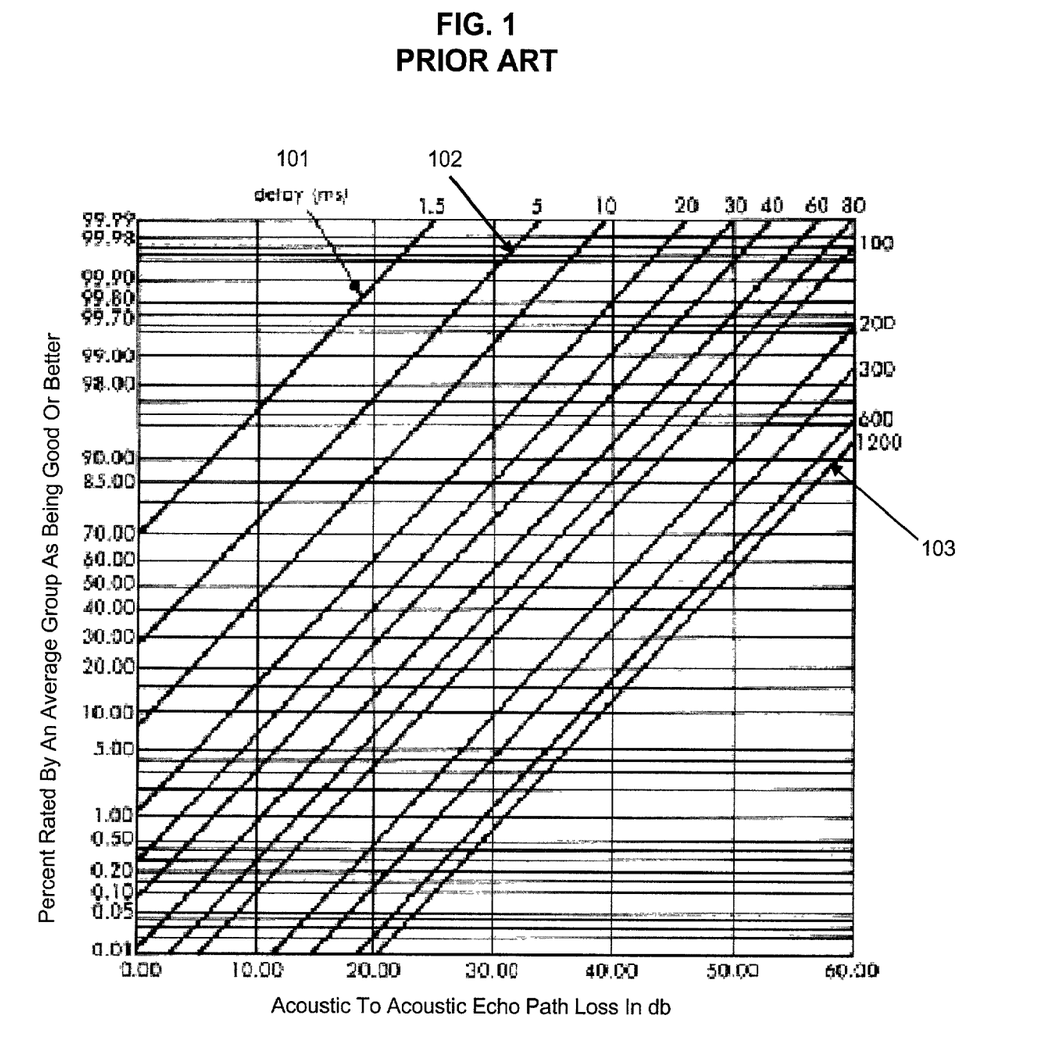
FIG. 1 illustrates a prior art graph that defines the relationship between human perception of echoes with respect to echo path loss and echo path delay.

Within the prior art, echoes within telephone switching systems are well known. Such echoes are normally caused by hybrid unbalanced conditions at a four-wire to two-wire conversion points in a local exchange carrier network or a telephone set or both. In addition, within a telephone set, acoustical feedback can cause echoes as well. There are two basic factors that determine whether echoes are perceived by humans or not. These two factors are highly interrelated. The first factor is the signal level of the echo return signal (also referred to as acoustic to acoustic echo path loss) which is defined as the level of the returned echo signal relative to the transmitted voice signal. The second factor is the time offset of the echo return signal relative to when the voice signal was generated by the talker. FIG. 1 illustrates in graphic form the manner in which loss (manifested in the relative strength of an originating signal and the strength of the returned echo signal) can be utilized to migrate the affects of echo. The lines such as lines 101 and 102 illustrate the echo path delay in milliseconds plotted against the acoustic-to-acoustic echo path loss in dB along the horizontal scale. Plotted on the vertical scale is the rating given by an average group of listeners with the percentage indicating the members of the group who believe that the resulting speech was good or better. The definition and use of the average group is defined in the book entitled Transmission Systems for Communications, Bell Telephone Laboratories, 5$^{th}$ Edition, 1982. Examining line 102, it can be seen that an average group of listeners finds an echo of 5 milliseconds very acceptable if the difference in the echo path loss is in excess of 30 dB. Conversely, if the echo path delay is 5 milliseconds and there is no loss, line 102 shows that only 30 percent of an average group would find this an acceptable telephone conversation. Even for a large echo delay of 1200 milliseconds as illustrated in line 103, if the echo path loss is 60 dB, 90 percent of an average group find that this amount of delay is acceptable. Contrast this against 1.5 milliseconds of echo path delay as illustrated by line 101 with no echo path loss. In this situation, only 70 percent of an average group would find acceptable a delay of 1.5 milliseconds with no echo path loss.

The human perception of echoes verses echo path loss has been well understood within the telephone industry for many years. The designers of prior art telephone switching systems have utilized the manipulation of path loss (referred to as the loss plan technique) to mitigate negative human perception of echoes. The loss plan technique was particularly effective when the national telephone system was controlled by the Bell System. The Bell System was able to implement the loss plan technique effectively. This technique was also aided by the fact that the majority of the prior art telephone switching equipment was circuit-switched equipment or time division multiplex, both of these types of switching systems have low delay times (on the order of a few milliseconds), because of this, the loss plan technique was capable of controlling the perception of echoes.

However, even in prior art switching systems, it has been necessary from time to time to utilize external echo cancellation circuits for severe cases. Indeed, the perceptual effects of echoes due to time offset as well as a high echo return signal are known. When echo returns are high, but delay is low, the perceptual effect is a side tone effect similar to the high side tones experienced in some European countries. On the other hand, the barrel perceptual effect which is encountered when two telephone sets are offhook at the same time occurs from relatively low time offsets in the range of 30–40 msec. When delays in the echo path are long, the perceptual effect is similar to the effect of bouncing ones voice off a mountain.

Echo cancellers (also referred to as echo cancellation circuits) for switching networks are normally finite impulse response digital filters that are implemented using DSP or ASIC circuits. These filters have the advantage that the device resources needed are roughly linearly proportioned to the echo cancellation tail length. An echo cancellation tail length is the time period relative to the reference between the end of the speech burst at the transmitting end and receipt of the end of the echo return at the transmitting end. The cost of an echo canceller is determined to a large extent by the length of the echo cancellation tail for which the echo canceller can compensate. Because the cost of echo cancellers increases as the echo tail length capability increases, it is highly desirable not to utilize echo cancellers that have an echo cancellation tail length greater than what is needed. Another type of echo canceller is an infinite impulse response filter which requires fewer resources than the finite impulse response digital filter but has stability problems.

The prior art telephone switching systems have approached the echo problem in two basic ways. The first is that adopted by the interexchange carriers which is to put an echo canceller on every link going to the local exchange carriers. The second method that has been adopted by most PBX (also referred to as business communications systems or enterprise switching systems) manufacturers has been to add echo cancellers to links to a local exchange carrier only when the need has arisen in the field. The technique utilized by the interexchange carriers is economic for these carriers since their connection to the local exchange carriers is only via high capacity digital trunks. Interexchange carriers deploy echo cancellers at the point of termination between their networks and local exchange carrier networks to avoid having problems with echoes generated in the local exchange networks being perceived by users as an interexchange carrier problem. For a variety of reasons that are described in the following paragraphs, PBX manufacturers are not free because of economic constraints to adopt the method used by the interexchange carrier nor will their prior art technique of adding echo cancellers on a need based scheme work either. A PBX is in many cases placed in the network between a local exchange carrier and an interexchange carrier. A PBX experiences the same echo environment as that seen by an interexchange carrier, and could be indicted by users as causing echo problems which actually occur in local exchange carrier networks. If not dealt with by the PBX, then, these problems are perceived by customers as being problems within the PBX.

PBX and other types of intermediate switch manufacturers face a number of problems with respect to echoes due to the changing environment in which PBXs are being used. The prior art PBX normally connected to telephones that were part of the PBX system (referred to as intercom telephones), local exchange carriers and occasionally to interexchange carriers. However, the prior art PBXs rarely were utilized to communicate a number of calls from a telephone connected to the local exchange carrier to an interexchange carrier. In this case, the PBX resides between the local exchange carrier and the interexchange carrier, and the echo problems of the local exchange carrier are assumed by the customers to be caused by the PBX. Where in reality, the problem is in the local exchange carrier with the delay through the interexchange carrier simply making these echoes perceptually more pronounced. One such situation is where the PBX is used as a call center system and has a number of remote call center agents connected through a local exchange carrier to the PBX. The PBX is receiving "800" type calls from the interexchange carrier and then is re-routing these calls via the local exchange carrier to the remote call center agents. The problem becomes particularly severe where the PBX is interconnected to the local exchange carrier via analog trunks.

Figure 2:
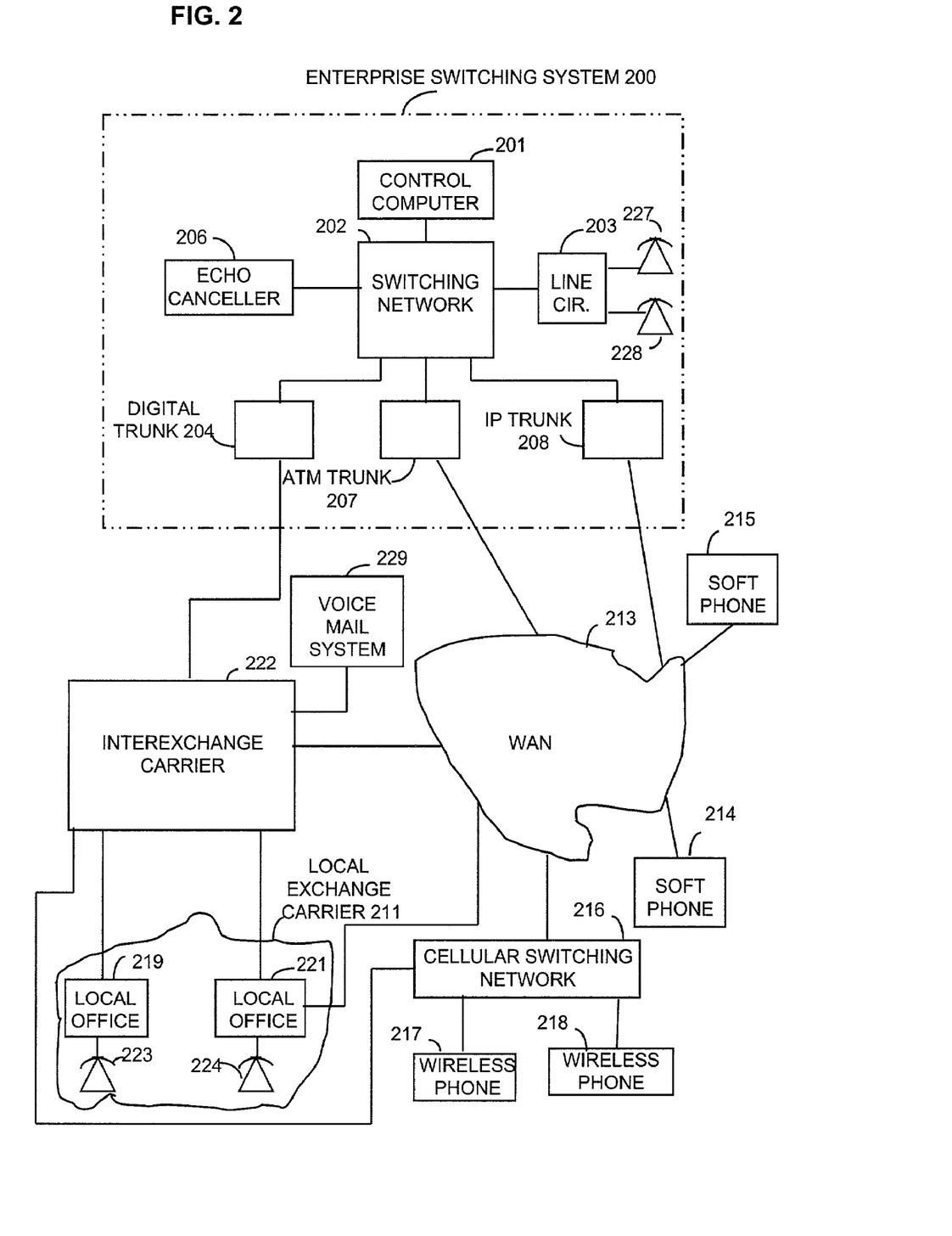
FIG. 2 illustrates a telecommunication network.

Within the prior art it is known to transmit voice calls over a packet switching network such as WAN 213 as illustrated in FIG. 2. The telecommunication terminals utilized to directly connect to a WAN are terminals such as soft phone 214 and 215. A soft phone may be a stand alone piece of equipment that generates and properly addresses packets containing voice information for transmission over WAN 213, or it may be a call application running on a personal computer. WAN 213 can be a combination of various packet switching systems such as ATM, Internet, or Intranet. The problems associated with communicating calls over WAN 213 are the delays that can occur during the transmission. In addition, another problem is that soft phones are implemented by various entities and there are no standards for controlling the acoustic echoes that can occur in a soft phone. Consequently, if a call is established between soft phone 214 and soft phone 215 via WAN 213 and soft phone 215 is not controlling the acoustic echo, the user of soft phone 214 may find the echo objectionable for the reasons that were set out with respect to FIG. 1. Mainly, the echo will be objectionable if the delay through WAN 213 is long, and the echo is of sufficient amplitude. If the call is being switched over the Internet, the delay will be long. Note, if the call is being switched by an ATM network within WAN 213, the delay will not be large. In addition, if soft phone 214 is engaged in a conversation with telephone 224 via WAN 213 and local office 221, this connection may have large echoes occurring because of mismatches in the telephone link between the local office 221 and telephone 224. These large amplitude echoes when combined with a large delay through WAN 213 will make the conversation objectionable to the user of soft phone 214. Similarly, if soft phone 214 is engaged in a conversation with wireless phone 218 via WAN 213 and cellular switching network 216. The resulting echo experienced within cellular switching network 216 in conjunction with its connection to wireless phone 218 may be objectionable to the user of soft phone 214. The prior art technique of introducing loss into the return path of the echo cannot be implemented in WAN 213. Nor, do prior art echo cancellers perform well to stop echoes from being objectionable to the user of soft phone 214. The reason is that prior art echo cancellers require computational resources that are roughly linearly proportioned to the echo cancellation tail length. Because of the large delay that can occur in WAN 213, the echo cancellation tail length becomes extremely long, and a prior art echo canceller is not economically implementable in a soft phone such as soft phone 214. Soft phone 214 tends to be either computationally limited in resources or is a relatively inexpensive device that cannot afford the cost of providing an echo canceller that has a very long tail length.

SUMMARY OF THE INVENTION

The aforementioned problems are solved and a technical advance is achieved in the art by an apparatus and method that determines the time delay between a transmitted signal and an echo. Then adjusts the echo canceller by the delay amount so that the echo canceller tail length is relatively short.

DETAILED DESCRIPTION

Figure 3:
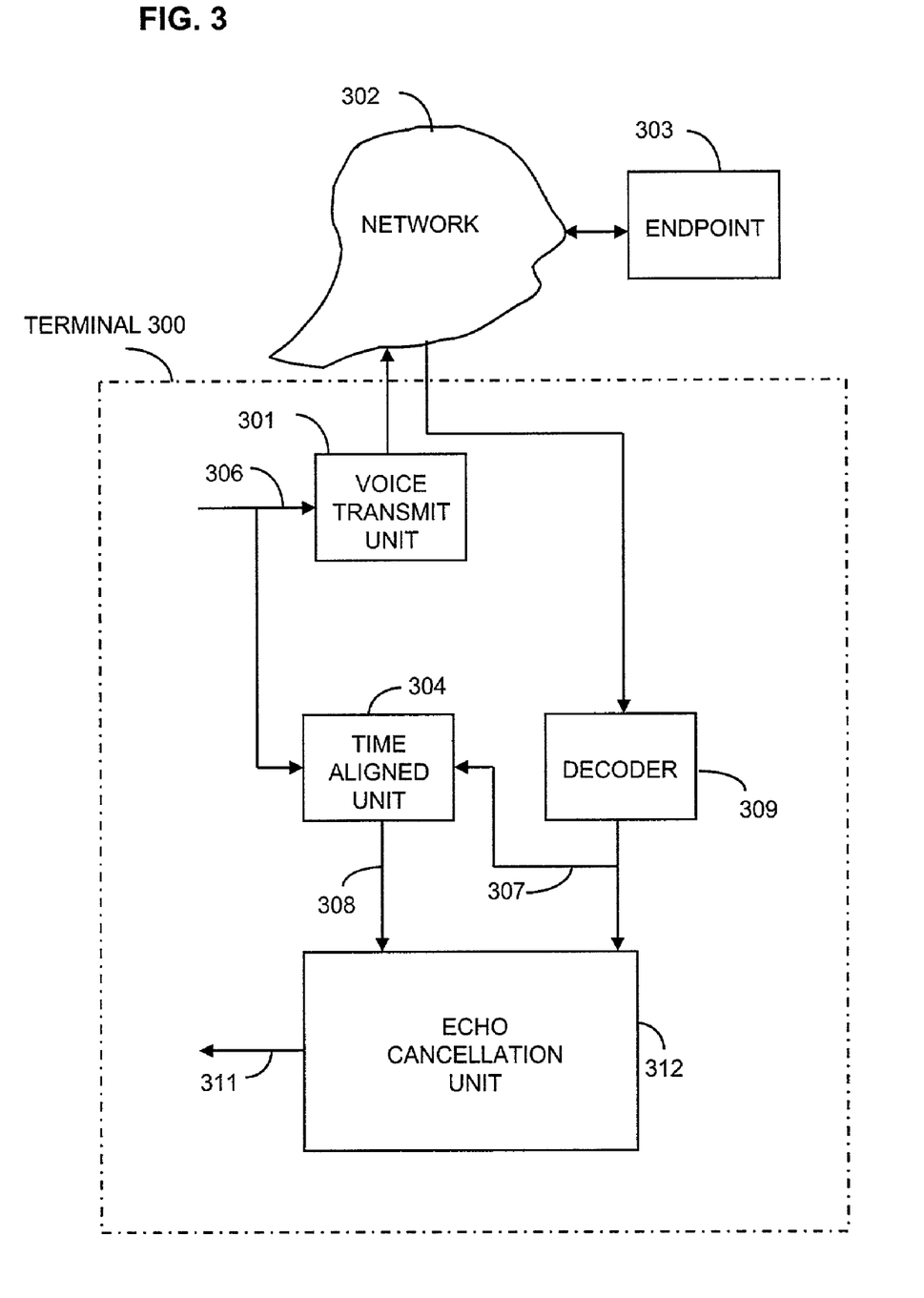
FIG. 3 illustrates an embodiment of the invention.

FIG. 3 illustrates an embodiment of the invention for use in a telecommunication terminal such as soft phone 214, wireless phone 218, and telephone set 228 of FIG. 2. Time aligned unit 304 is responsive to input signal 306 and output signal 307 to generate a signal of output 306 time shifted (output signal 308) with respect to the transmission delay to be only slightly ahead of output signal 307. The amount of delay is less than 25% of the tail-length. Output 308 and 307 are then processed by echo cancellation unit 312 to reduce the echoes present in the output of 307 to an acceptable level and to transmit this corrected signal on output 311. By time aligning the input signal 306 with the received signal 307 from network 302, the echo cancellation tail of echo cancellation unit 312 can be greatly reduced. The reduction of the echo cancellation tail greatly reduces the amount of computational processing that must be done to eliminate echoes in the return signal from network 302. Network 302 can comprise a variety of items that interconnect terminal 300 to end point 303. For example, if end point 303 is soft phone 215 and terminal 300 is soft phone 214, network 302 is simply WAN 213. However, if soft phone 214 is terminal 300 and is engaged in a communication call with wireless phone 218, network 302 then is the combination of WAN 213 and cellular switching network 216. Similarly, if soft phone 214 is engaged in a communication call via WAN 213 and local office 221 to telephone set 224, then, network 302 is WAN 213 and local office 212. Echo cancellation unit 312 is an echo canceller as is well known to those skilled in the art. The output 308 from time aligned unit 304 is purposefully not completely aligned with output signal 307 so that echo cancellation unit 312 can operate in a normal manner. One skilled in the art however could readily see that echo cancellation unit 312 could be designed so that the time alignment of output 308 could match output 307 or could indeed be ahead of output 307.

Figure 4:
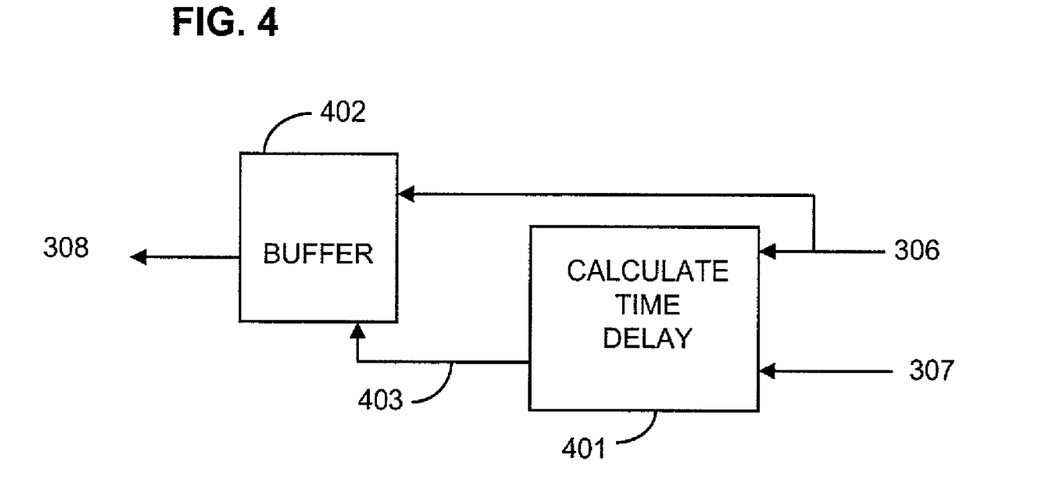
FIG. 4 illustrates, in block diagram form, an embodiment of a time aligned unit.

FIG. 4 illustrates time aligned unit 304 in greater detail. Block 401 calculates the time delay between the transmitted signal 106 and the received signal 107. Greater details in how this time delay is calculated are give with respect to FIG. 5. Block 401 outputs the calculated time delay via output 403 to buffer 402. Buffer 402 which buffers transmitted output 306 utilizes the calculated time delay to determine what portion of buffer 402 is slightly ahead of the present received signal 307. The output of buffer 402 is transmitted on output 308. As previously noted, echo cancellation unit 312 utilizes the signal of output 308 and the signal of output 307 to correct the effects of echoes being received back from network 302.

Figure 5:
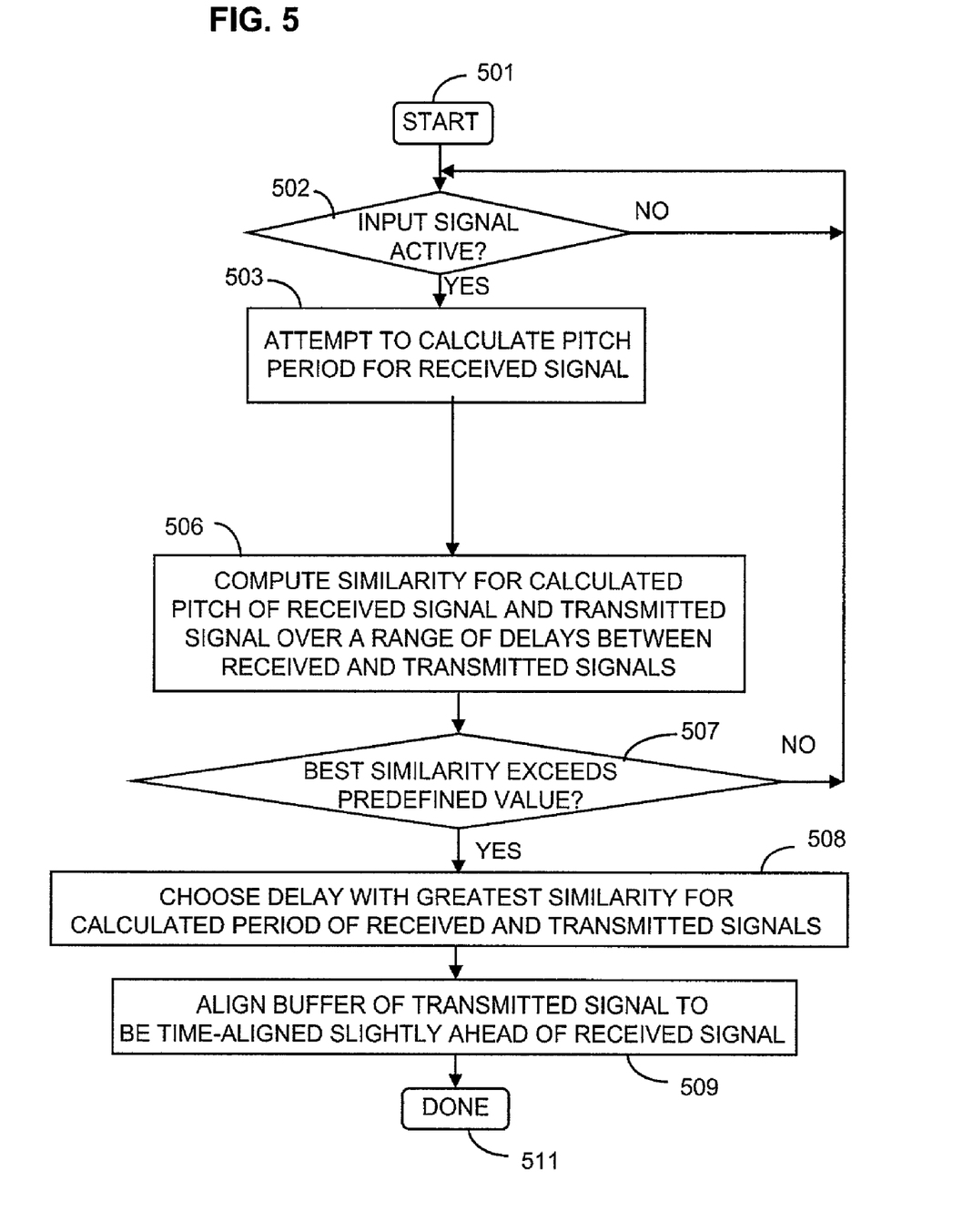
FIG. 5 illustrates, in flowchart form, operations performed by an embodiment of the invention.

FIG. 5 illustrates, in flowchart form, steps performed in implementing an embodiment of the invention. One skilled in the art would readily recognize that other methods exist for time aligning two signals and also for detecting whether or not there is an echo in a return signal. FIG. 5 illustrates the operation of an embodiment of blocks 401 and 402 of FIG. 4. Once started from block 501, block 502 determines if there is an input signal which determines whether or not the terminal is transmitting voice information to the end point. If the answer in decision block 502 is no, the decision block is repeated. If the answer is yes in decision block 502, block 503 calculates the pitch period for the received signal from end point 303 of FIG. 3. Then, block 506 computes the similarities for the calculated pitch of the received signal and the transmitted signal over a range of delays between the received and transmitted signals. Decision block 507 then determines if the best similarity calculated in block 506 exceeds a predefined value. If the best similarity does not exceed a predefined value, it is interpreted to mean that the end point is also generating voice information, and control is transferred back to decision block 502. If the answer in decision block 507 is yes, block 508 chooses the delay having the greatest similarity for the calculated period of the received and transmitted signals. Finally, block 509 aligns the buffer of the transmitted signal to be time-aligned slightly ahead of the received signal so that echo cancellation unit 312 can eliminate or reduce the effect of the echo. After execution of block 509, the operation is completed in block 511.

Consider now in greater detail the operations performed by block 503 of FIG. 5 in calculating the pitch period for the received signal. The assumption is made that for human speech sampled at 8 kHz that the possible range of pitch period values, T, range from a minimum, $T_{min}$, of 19 samples, to a maximum, $T_{max}$, of 140 samples. Within this range of possible pitch periods, T, a score S(T) is calculated for each possible pitch period by the following calculation:

$$S(T) = \frac{1}{T}\sum_{n=0}^{T} |x[n] - x[n-T]| \quad \text{Equation 1}$$

This equation sums the absolute difference between samples from a current period and the previous period for a range of T samples and then divides the result by T. The optimal calculated period, $T_{opt}$, is found by taking the computed values for S(T) and finding the value of T which gives the minimum S(T). This value of T is designated $T_{opt}$.

Consider now in greater detail the operations performed by block 506 in one embodiment of the invention. The operations of block 506 are illustrated in the following two equations:

$$A[d] = \frac{\sum_{n=0}^{T_{opt}} [x[n-d]y[n]]}{\sum_{n=0}^{T_{opt}} [x[n-d]]^2} \quad \text{Equation 2}$$

$$P[d] = \frac{\sum_{n=0}^{T_{opt}} [y[n] - A[d]x[n-d]]}{\sum_{n=0}^{T_{opt}} [y[n]]^2} \quad \text{Equation 3}$$

These equations are calculated for a range of delays from $D_{min}$ to $D_{max}$. The two equations calculate a value that is essentially the periodicity between the transmitted and received signals. The first of these two equations, equation 2, calculates a value, A[d], for each of the delays within the range. Each of these values of A is then utilized to calculate values, P[d], for each of the delays over the range of delays by repeatedly calculating equation 3. To determine the optimal delay, $D_{opt}$, the following equation is calculated:

$$D_{opt} = \min\{P[d]\} \quad \text{Equation 4}$$

$D_{opt}$ is equal to the delay whose value, P, is the smallest. Equation 4 implements block 508 of FIG. 5. Block 402 of FIG. 4 is then responsive to the value, $D_{opt}$, to align the transmitted signal with the received signal.

Figure 6:
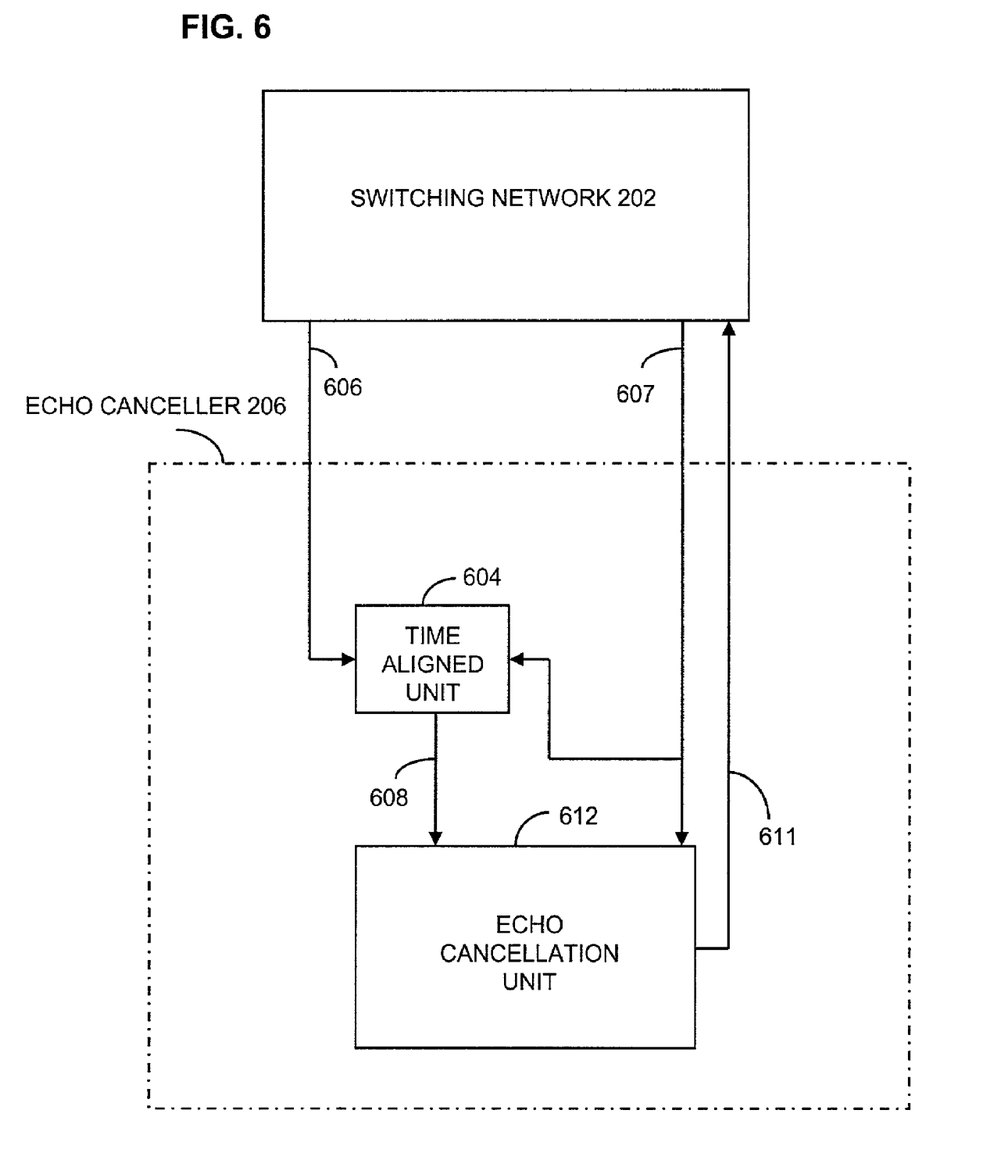
FIG. 6 illustrates an embodiment of the invention that functions in conjunction with a switching network.

FIG. 6 illustrates another embodiment of the invention. The embodiment illustrated in FIG. 6 is designed to function with a switching network. FIG. 6 illustrates that the embodiment is functioning with switching network 202 of Enterprise Switching System 200 of FIG. 2. However, one skilled in the art would readily recognize that the embodiment illustrated in FIG. 6 could be used in interexchange carrier 222, local offices 219 and 221, and cellular switching network 216. In addition, the embodiment illustrated in FIG. 6 could be utilized with WAN 213.

For illustration, assume that telephone set 228 is engaged in a conversation with soft phone 215 via line circuit 203, switching network 202, ATM trunk 207, and WAN 213. Control computer 201 controls switching network 202 so that the information transmitted by telephone set 228 is not only transmitted to ATM trunk 207 but is also transmitted via cable 606 to time aligned unit 604. In addition, switching network 202 transmits the audio information received from soft phone 215 to time aligned unit 604 via cable 607. Time aligned unit 604 functions in the same manner as time aligned unit 304 of FIG. 3. Echo cancellation unit 612 is responsive to signals on cable 607 and 608 to reduce the effect of the echo in the return path. This information is then transmitted back to switching network 202 via cable 611. It is the audio information on cable 611 that is transmitted to telephone set 228.

Of course, various changes and modifications to the illustrative embodiment described above will be apparent to those skilled in the art. These changes and modifications can be made without departing from the spirit and scope of the invention and without diminishing its intended advantages. It is therefore intended that such changes and modifications be covered by the following claims except insofar as limited by the prior art.

What is claimed is:

1. A method for performing echo cancellation in a transmitting telecommunication endpoint, comprising the steps of:
calculating transmission path delay by the transmitting telecommunication endpoint from the transmitting telecommunication endpoint to a receiving telecommunication endpoint and back wherein the step of calculating comprises the steps of further calculating pitch periods for transmitted information and calculating pitch periods for received information, and comparing the pitch periods of the transmitted information with the pitch periods of the received information to determine the transmission path delay by computing similarities between the pitch periods of the transmitted information and the pitch periods of the received information and using the highest similarity to determine the transmission path delay;
delaying by the transmitting telecommunication endpoint information transmitted to the receiving telecommunication endpoint by the transmitting telecommunication endpoint by the calculated transmission path delay to produce delayed information; and
performing by the transmitting telecommunication endpoint echo cancellation on information received from the receiving telecommunication end point using the delayed information.

2. The method of claim 1 wherein the step of computing comprises the step of calculating similarities between the pitch periods of the transmitted information and received information over a range of delays; and
selecting a delay of the range having the highest similarity to be the transmission path delay.

3. The method of claim 2 wherein the highest similarity is only used to determine the transmission path delay if the highest similarity exceeds predefined value.

4. The method of claim 3 wherein the received information and transmitted information are audio information.

5. The method of claim 2 wherein the step of delaying comprises delaying the delayed information for less than the transmission path delay.

6. The method of claim 5 wherein the received information and transmitted information are audio information.

7. The method of claim 1 wherein the received information and transmitted information are audio information.

8. The apparatus of claim 1 wherein the buffer delays the received information for less than the transmission path delay.

9. The apparatus of claim 8 wherein the received information and transmitted information are audio information.

10. An apparatus for reducing an echo cancellation tail length in an echo canceller in a telecommunication endpoint, comprising:
a calculator in the transmitting telecommunication endpoint for determining a round trip transmission path delay between a transmitting telecommunication endpoint and a receiving telecommunication endpoint wherein the calculator further calculates pitch periods of transmitted information and pitch periods of received information, and further compares the pitch periods of the transmitted information with the pitch periods of the received information to determine the transmission path delay by computing similarities between the pitch periods of the transmitted information and the pitch periods of the received information and using the highest similarity to determine the transmission path delay;
a buffer in the transmitting telecommunication endpoint for delaying information transmitted from the transmitting telecommunication endpoint; and
the echo canceller in the transmitting telecommunication endpoint responsive to received information from the receiving telecommunication endpoint and delayed information from the buffer for reducing the echo in the received information.

11. The apparatus of claim 10 wherein the calculator further calculates similarities between the pitch periods of the transmitted information and received information over a range of delays; and
the calculator further selects a delay of the range having the highest similarity to be the transmission path delay.

12. The apparatus of claim 11 wherein the highest similarity is only used to determine the transmission path delay if the highest similarity exceeds predefined value.

13. The apparatus of claim 12 wherein the received information and transmitted information are audio information.

14. The apparatus of claim 10 wherein the received information and transmitted information are audio information.

15. An apparatus in a transmitting telecommunication endpoint for time offset between transmitted voice signals and received voice signals in an echo cancellation operations, comprising:
means in the transmitting telecommunication endpoint for determining a round trip transmission path delay wherein the means for calculating comprises means for calculating pitch periods of the transmitted voice signals and pitch periods of the received voice signals and means for comparing the pitch periods of the transmitted voice signals with the pitch periods of the received voice signals to determine the transmission path delay by computing similarities between the pitch periods of the transmitted voice signals and the pitch periods of the received voice signals and means for using the highest similarity to determine the transmission path delay; and
means in the transmitting telecommunication endpoint for delaying transmitted voice signals by the determined round transmission path delay so that the time offset between transmitted voice signals and received voice signals is reduced.

16. The apparatus of claim 15 wherein the means for calculating further comprises means for calculating similarities between the pitch periods of the transmitted voice signals and received voice signals over a range of delays; and
means for selecting a delay of the range having the highest similarity to be the transmission path delay.

* * * * *